United States Patent [19]
McNary et al.

[11] Patent Number: 5,644,508
[45] Date of Patent: Jul. 1, 1997

[54] DETECTION OF MOVING OBJECTS

[75] Inventors: Charles A. McNary, Calabasas, Calif.; Thomas K. Lo, Tucson, Ariz.; Jack M. Sacks, deceased, late of Thousand Oaks, by P. A. Sacks, heiress; Nam D. Banh, Canoga Park, both of Calif.

[73] Assignee: Hughes Electronics, Los Angeles, Calif.

[21] Appl. No.: 465,668

[22] Filed: Jun. 5, 1995

[51] Int. Cl.$^6$ ................................. G01S 13/66
[52] U.S. Cl. ................ 364/516; 382/260; 342/159
[58] Field of Search .................. 364/516, 920.7, 364/920.8; 342/159, 160, 162; 358/466; 382/162, 260, 261, 262

[56] References Cited

U.S. PATENT DOCUMENTS

| | | | |
|---|---|---|---|
| 4,949,389 | 8/1990 | Allebach et al. | 382/31 |
| 5,426,785 | 6/1995 | Coffield | 395/800 |
| 5,471,320 | 11/1995 | Jodoin et al. | 358/455 |
| 5,493,419 | 2/1996 | Jodoin et al. | 358/455 |
| 5,499,195 | 3/1996 | Castelaz | 364/516 |

OTHER PUBLICATIONS

Silverman et al., "Performance Metrics for Point Target Defection in Consecutive Frame IR Imagery", Abstract 1995.

*Primary Examiner*—James P. Trammell
*Assistant Examiner*—Patrick Assouad
*Attorney, Agent, or Firm*—Charles D. Brown; Wanda K. Denson-Low

[57] ABSTRACT

Moving objects (36) are detected by processing images through a spatial filter (42) and positional shifter (46), which shifts the image by an amount reflecting a line of sight velocity hypothesis of the objects. The images are stacked together by a stacker 48, causing the intensity of an object moving at the line of sight velocity hypothesis to increase, and other objects to be blurred. The stacked image is spatially filtered (50) to remove the blurred objects and linear artifacts, and the moving objects (36) of interest are selected according to their increased intensities. In a practical system, the images are processed with a range of velocity hypotheses to identify both the object and the true line of sight velocity.

17 Claims, 5 Drawing Sheets

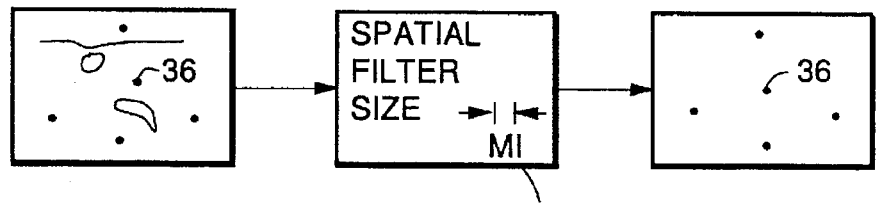
FIG. 6.
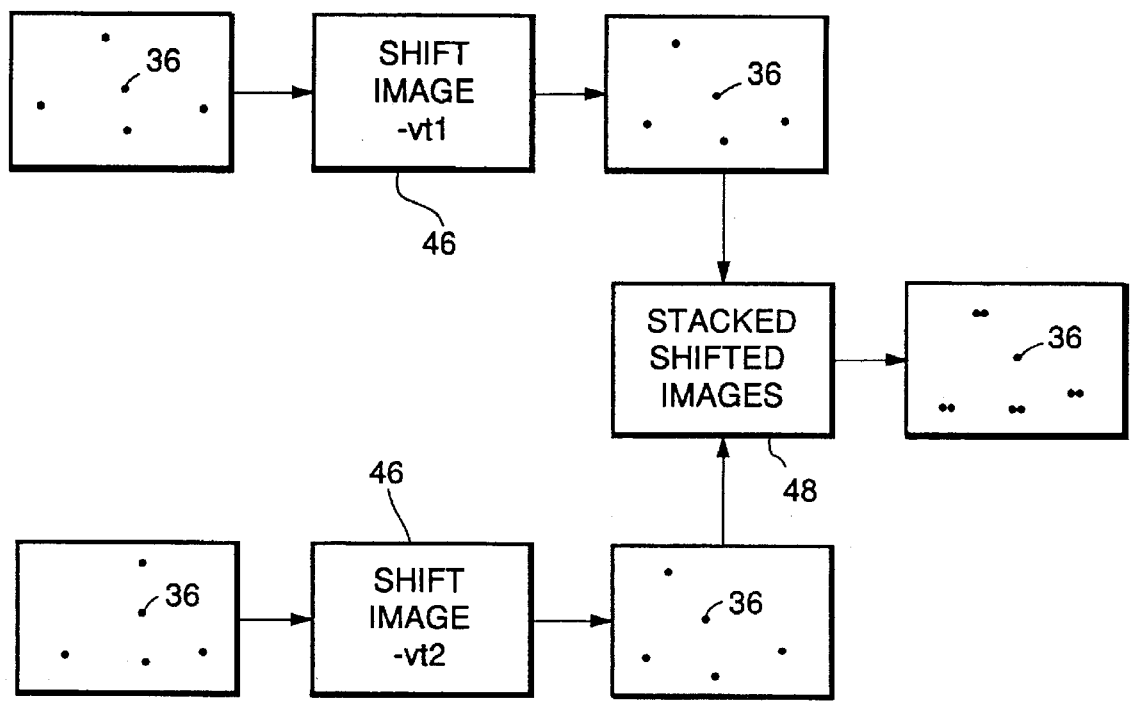
FIG. 7.
FIG. 8.
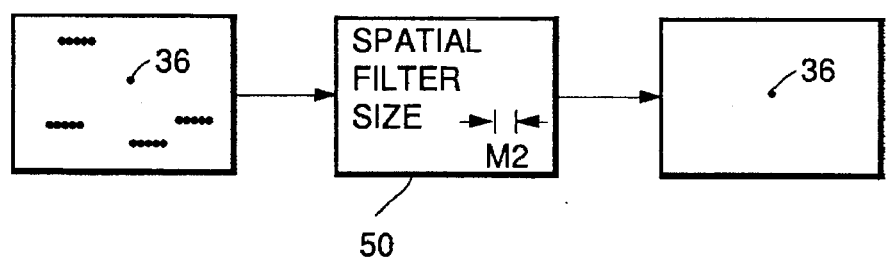

DETECTION OF MOVING OBJECTS

BACKGROUND OF THE INVENTION

This invention relates to the detection of moving objects, and, more particularly, to a technique suitable for use by automated sensor systems.

The ability to detect small moving objects in an automated system is important in a variety of contexts. For example, most fighter aircraft utilize air-to-air missiles as their primary offensive weapon. To minimize the danger to the launch aircraft, the missile is desirably launched when the target is at a great distance from the aircraft and directed to the target. The missile usually has a sensor that is useful when the target is nearly directly forward of the missile and fairly close to the missile, and is thus of most value for terminal guidance.

In a typical scenario, a target is first acquired by a targeting aid such as a ground-based radar or an AWACS aircraft. After the target is identified as potentially hostile, this information and the approximate location and velocity of the target are communicated to the launch aircraft. The targeting information is downloaded into the missile guidance computer, and the missile is launched. The missile then flies a pattern either directly toward the target on in a circuitous path so that the target continues to exhibit relative motion. The position and velocity of the target may be periodically updated with messages from the targeting aid to the missile guidance computer in some designs, and there may be no communication with the missile after launch in other designs. For a successful mission, the sensor of the missile acquires the target during the terminal flight phase and guides the missile to the target.

In the terminal phase of the flight, the missile targeting computer must be able to identify the target. In an ideal situation, the target would be the only feature in the field of view of the sensor and would have a high contrast level against a uniform background such as the sky. The ideal situation is seldom realized, and instead in the usual case the missile targeting computer must be able to automatically identify a moving target in the midst of background clutter and other features in the field of view of the sensor. The detection of a small moving object becomes more difficult when the background is cluttered by other objects such as reflections from the surface of the sea or the great variety of features that are seen when an object moves with the earth or the horizon as the background. In these cases, the potential target is most likely smaller and has lower contrast relative to the majority of the background clutter.

Several techniques have been developed to address this complex problem. In one, spatial filters are used to remove objects larger than a preselected size from a scene. In many cases, however, the object is about the same size as much of the clutter, and therefore the clutter cannot be removed using only a spatial filter. In another technique, the stationary backgrounds are aligned in successive images and subtracted, leaving only moving objects (including the target) for subsequent threshold detection. While operable for many situations, this approach has the limitation that there must be an accurate registration of successive images. In another technique, the power spectrum of the scene is used to suppress the background clutter. This approach requires a priori knowledge of the power spectrum unique to the particular clutter background or the ability to determine that power spectrum rapidly for each scene. Further, many small clutter objects contribute little to the overall power spectrum of the scene, and therefore may not be effectively suppressed by the power spectrum approach. All of these approaches have difficulty in suppressing line-like features that extend parallel to the direction of movement of the target.

There is therefore a need for an improved approach for detecting small moving objects against a cluttered background and in the practical context required for military systems. The present invention fulfills this need, and further provides related advantages.

SUMMARY OF THE INVENTION

The present invention provides an approach for detecting a small moving object in a scene having a cluttered background. It is effective in identifying an object against a land or sea background, even when the object is moving parallel to a long straight feature of the scene. No knowledge of the nature of the clutter, such as its power spectrum, is required. The present invention can be implemented using a microprocessor and associated low-level dedicated hardware for low-level functions, in a sensor system.

In accordance with the invention, a method for detecting moving objects comprises the steps of furnishing an imaging sensor and forming a plurality of filtered, shifted sensed images of a scene containing a moving object beginning at an initial time and continuing to later times. Each of the filtered, shifted images is prepared by providing a sensed image of the scene at a time t (measured from an initial time t=0) from the sensor and spatially filtering the sensed image to remove objects of a size larger than a preselected size, to produce a filtered image. The position of the filtered image is shifted by an amount $-vt$, where v is a velocity hypothesis, to produce a filtered, shifted image. These steps are repeated at later times to produce a plurality of filtered, shifted images.

The plurality of filtered, shifted images are added together to produce a stacked image. The stacked image is spatially filtered to remove linear features larger than a preselected size resulting from small, point-like clutter features not moving at velocity v, to produce a filtered, stacked image. The method is completed by selecting those features, if any, of the filtered, stacked image having an intensity greater than a preselected intensity as the moving objects.

In some instances, the initially sensed images may not have sufficient image contrast to be properly filtered. In those cases, a plurality of the same image may be added together and used as the initially sensed image.

There are two spatial filters used in the above-described approach. The first removes image objects larger than a preselected size from the original image. The second operates on the stacked image and removes linear feature artifacts. Preferably, each of the spatial filters is accomplished using a minimum difference processor filter. The difference processor filter desirably utilizes four linear antimedian subfilters.

In most instances, the line-of-sight velocity v will not be known exactly as an initial matter, but will be known approximately from the information provided by the targeting aid. The filtering and stacking functions are therefore performed with several velocity hypotheses $v_i$, which bracket the true velocity v. The velocity hypothesis that produces the objects of greatest intensity in the final image is selected as the true velocity of the target.

The present invention provides an approach that is applied to rapidly identify the presence and exact line of sight velocity of small objects, against cluttered or clean backgrounds. Knowledge of the background and nature of the clutter is not required. Other features and advantages of the invention will be apparent from the following more detailed description of the preferred embodiments, taken in conjunction with the accompanying drawings, which illustrate, by way of example, the principles of the invention.

DETAILED DESCRIPTION OF THE INVENTION

FIG. 6 is a diagrammatic depiction of the operation of, and the result produced by, the first spatial filter;

FIG. 7 is a diagrammatic depiction of the operation of, and the result produced by, the image shifter and the stacker;

FIG. 8 is a diagrammatic depiction of the operation of, and the result produced by, the second spatial filter.

DETAILED DESCRIPTION OF THE INVENTION

Figure 1:
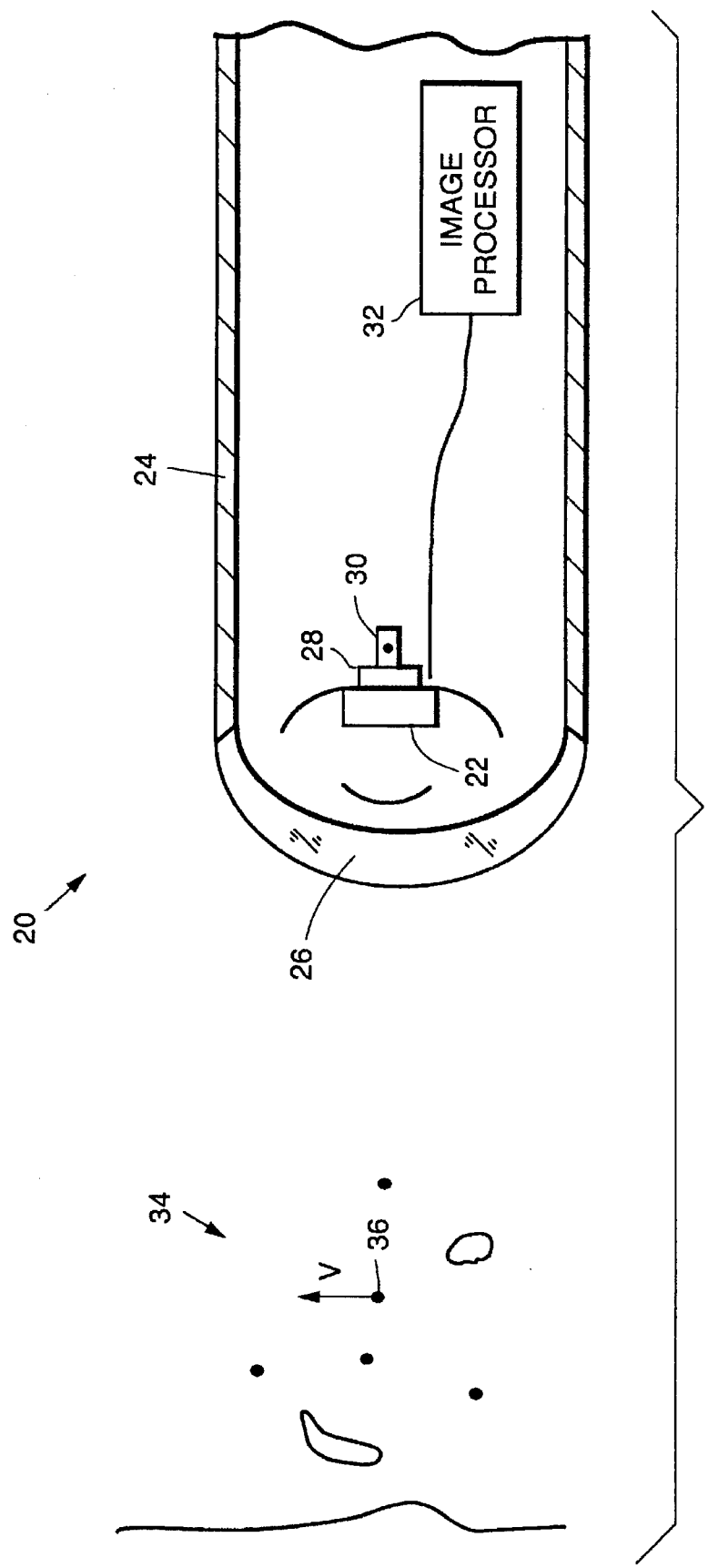
FIG. 1 is a schematic plan view diagram of a scene and a sensor system.

FIG. 1 depicts a sensor system 20 including an imaging sensor 22, typically operating passively in the visible-to-infrared spectrum, mounted in the nose of a missile 24. The sensor 22 faces generally forwardly through a window 26, and is mounted on a gimbal 28 and driven by a motor 30 so that it may be pointed at an angle to the forward direction. The output of the sensor 22 is supplied to an image processor 32 in the guidance computer, which will be discussed in greater detail subsequently. The images provided from the sensor 22 are digitized and produce a series of images, each of which is formed of an array of pixels. The images are taken sequentially at times t1, t2, . . . tn, measured from a starting time t=0.

Figure 2:
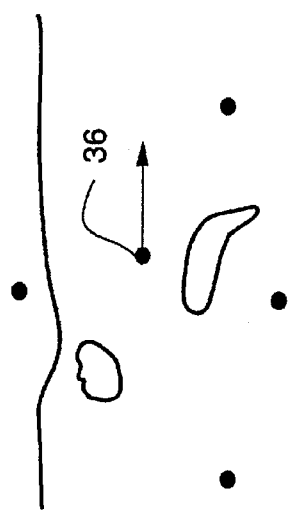
FIG. 2 is a schematic drawing of an image as produced by the sensor.

The sensor 22 views a scene 34, which is shown in plan view in FIG. 1 and in the elevational view as seen by the sensor 22 in FIG. 2. The scene 34 includes at least one target 36 moving with a line-of-sight rate v relative to the sensor 22. Additionally, there will be other features in the scene, including features much larger than the target 36 and features on the same order of size as, or smaller than, the target 36. One commonly encountered type of feature is a long horizontal line, the horizon. The line of sight velocity v is often roughly parallel to the horizon line. There are also usually features arising from defective elements on the sensor 22, which are termed fixed pattern noise.

The target 36 is intermixed with these other features in the scene 34 viewed by the sensor 22. It is difficult to isolate the moving target from this array of other features, generally termed "clutter". By way of example of the type of problem presented but not of limitation, the target 36 often subtends an angle less than that of a pinhead held at arm's length. It is present in an image as provided by the sensor 22 mixed with other features of about the same size, smaller features, larger regular and irregular features, and, frequently, linear features.

Figure 3:
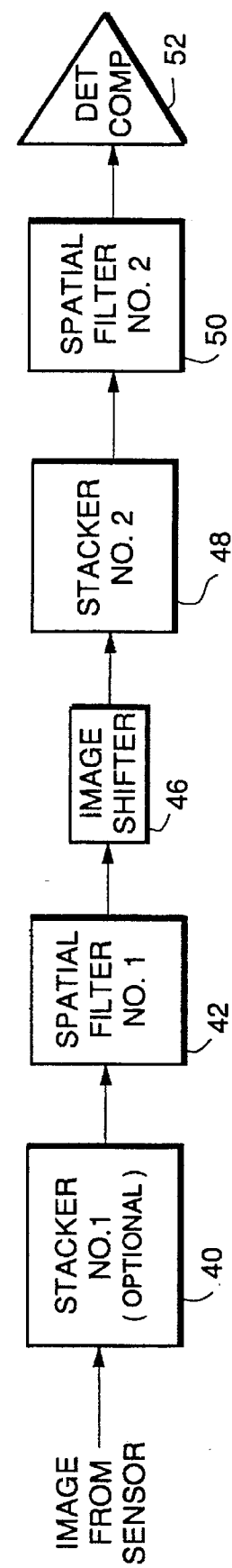
FIG. 3 is a block diagram of the processing approach of the invention.

FIG. 3 is a block diagram for the operation of the image processor 32. The first operation is an optional first stacker 40 of a number of contiguous images with a common line of sight to produce a stacked image at time t. The stacking is accomplished by adding the values of the intensities of corresponding pixels, for each pixel in the image sequence, termed "pixel-by-pixel" addition. The single image is replaced by the stacked image. This stacking is optional, and is used if the image intensity and contrast are too low in the form initially provided by the sensor 22. When the first stacker 40 is used, the output of the stacker 40 replaces the sensed image in subsequent analysis.

The image provided by the sensor 22, or the stacked image produced by the optional first stacker 40, is spatially filtered in a first spatial filter 42. A spatial filter removes features from an image according to some size criterion.

Figure 4:
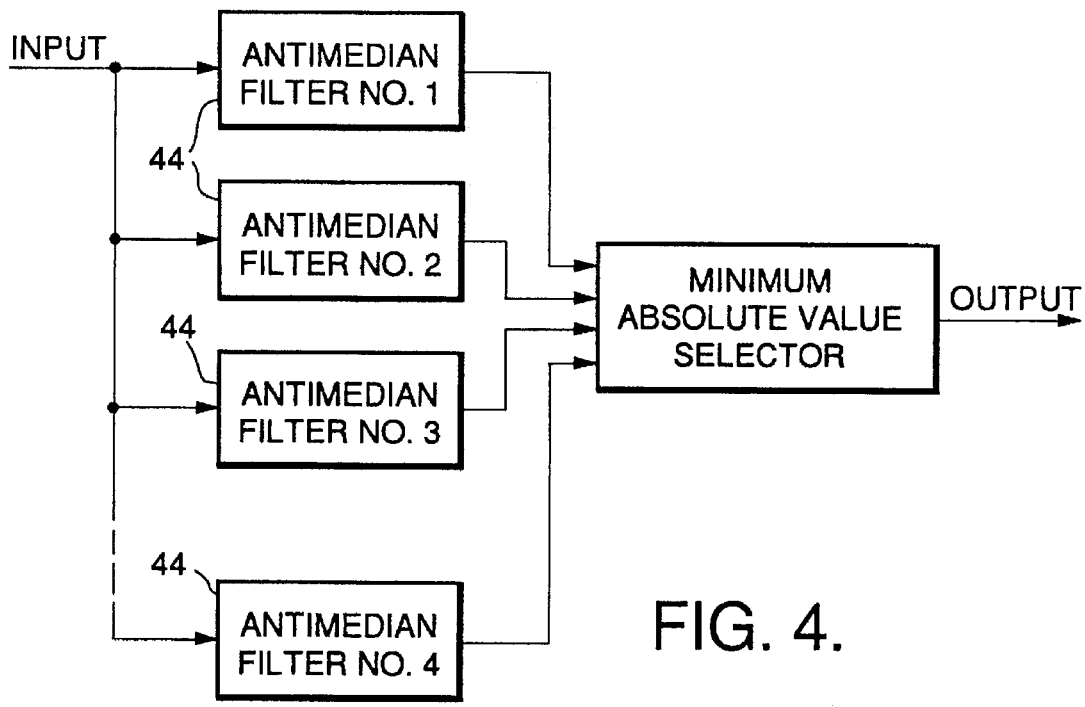
FIG. 4 is a block diagram of the spatial filter.
Figure 5:
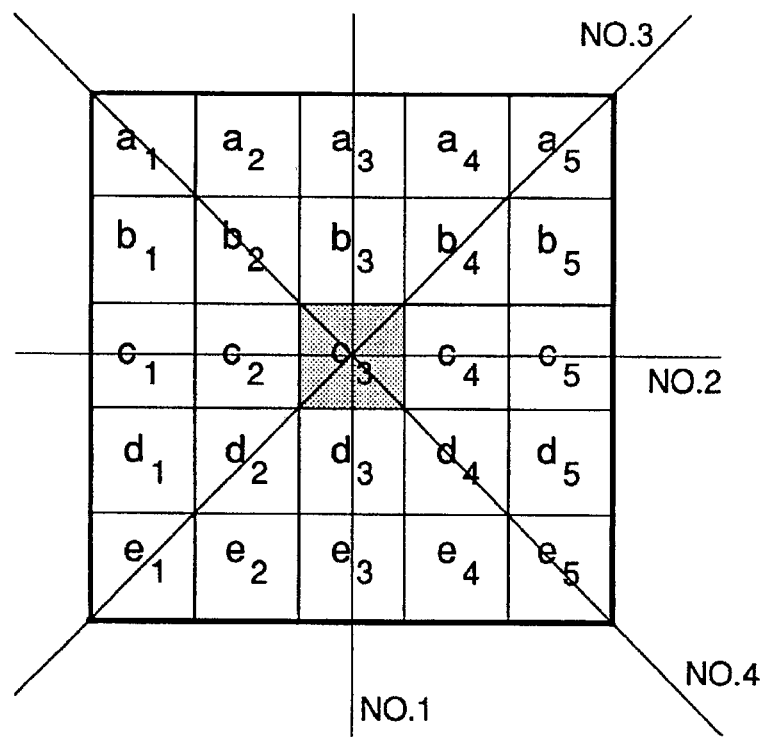
FIG. 5 is a schematic depiction of the operation of four antimedian filters.

The preferred spatial filter is a nonlinear filter of the minimum difference processor type, as illustrated in FIG. 4. The minimum difference processor preferably uses four one-dimensional antimedian filters 44 operated in parallel at four angles to the pixel matrix, as shown in FIG. 5. The minimum difference processor has, as its output, the output of the particular anti-median filter with the minimum magnitude. Each one-dimensional antimedian filter operates on 2M+1 pixels, each of whose intensities is known. The output of the one-dimensional antimedian filter is the value of the center pixel minus the median of the 2M+1 pixels addressed by the filter. By performing the minimum difference processor on the pixels of the image, objects whose dimensions are substantially greater than M in any direction will be eliminated from the image. Antimedian filters are described in greater detail in U.S. Pat. 4,975,864, whose disclosure is incorporated by reference.

In the present case, features larger than some first preselected size are identified and removed from the image, as illustrated in FIG. 6. Here, objects larger than the indicated size M1 are removed from the image, numeral 42, to produce an image having only features smaller than M1 in size. It is important to remove large features from the image at this stage, prior to the image shifting and stacking procedure. The image stacking process can sharpen the pulse shape of large objects/ These sharpened pulses are not removed by subsequent spatial filtering and therefore can be confused with the true target 36.

After the first spatial filter 42, the images are shifted by an amount −vt, where v is a constant equal to the velocity hypothesis used for the image processing, and t is the time relative to a starting time t=0, as indicated at numeral 46 in FIGS. 3 and 7. In this example, the value of v is assumed to be the true velocity of the target. The subject of identifying the actual true velocity when only the approximate velocity is known will be addressed subsequently.

After each image is shifted by the indicated amount −vt, the images are added together on a pixel-by-pixel basis in a second stacker 48 (FIGS. 3 and 7). Inasmuch as the target 36 moves at velocity v and moves a distance vt in time t, the target will occupy the same pixels in each image after the shift of −vt in the image shifter step 46. This addition is termed "coherent addition", as the pixel intensity of the feature of interest, the target, is increased but the apparent size of the target in the stacked image is not increased. By comparison, a feature not moving at velocity v will be enlarged in size and broadened without substantial increase in pixel intensity.

FIG. 7 illustrates the result of shifting and stacking a number of images of the type shown in FIG. 6. Features not moving at velocity v become streaked along the direction v, while the target 26 moving at v retains the same size and is unstreaked. In FIG. 7 only two images are stacked, and therefore the streaking is relatively short in length. As more images, separated by increasing times, are stacked, the streaks of features other than the target 36 become longer, while the target 36 remains essentially unstreaked due to the image shifting −vt for each stacked image. The target 36 is also of greater pixel intensity after stacking of multiple images, although this increase in intensity is difficult to portray in the illustration.

The streaked features are removed from the shifted-and-stacked image by a second spatial filter 50. The same minimum difference processor and antimedian filter approach discussed in relation to the first spatial filter 42 and shown in FIGS. 4 and 5 is preferably also used in the second spatial filter. The parameter M2 of the second spatial filter is chosen to suppress objects with sizes greater than the size of the target in the second stacked image 48.

The result of the second spatial filter 50 is shown in FIG. 8. Here, the input image is depicted as having relatively longer streaking, due to the stacking of more images than was illustrated for FIG. 7. The elongated streaked patterns due to the features not moving at velocity v are removed, as long as they are larger than the discrimination size M2 of the spatial filter, leaving only the target 36.

The target 36 is selected against the generally now-uncluttered background by an optical discriminator 52. The threshold discriminator 52 compares the intensity of any feature in the image with a preselected comparison threshold, and identifies that feature as the target 36.

Two problems remain in selecting the appropriate feature of the image as the target. First, it is possible that fixed pattern noise might be mistaken for the target. To ensure that the fixed pattern noise features are removed in the second spatial filter 50, the sensor 22 may be physically moved by the motor 30 operating with the gimbal 28 so that any fixed pattern noise has an apparent velocity different from the true velocity v. That is, the sensor 22 is preferably moved, as in a circular pattern, so that the apparent velocity of any fixed pattern noise features is non-colinear with the vector v in at least some of the images, ensuring that such features cannot be mistaken for a target.

A second problem is that the velocity used in the processing just described may not be the actual velocity v of the target. The information provided by the targeting aid is normally a good approximation of the true velocity, but cannot be relied upon to be exact. If the velocity hypothesis is not equal to the true velocity of the target, both the target and the clutter will be smeared into streaks and will be removed by the second spatial filter 50.

Figure 9:
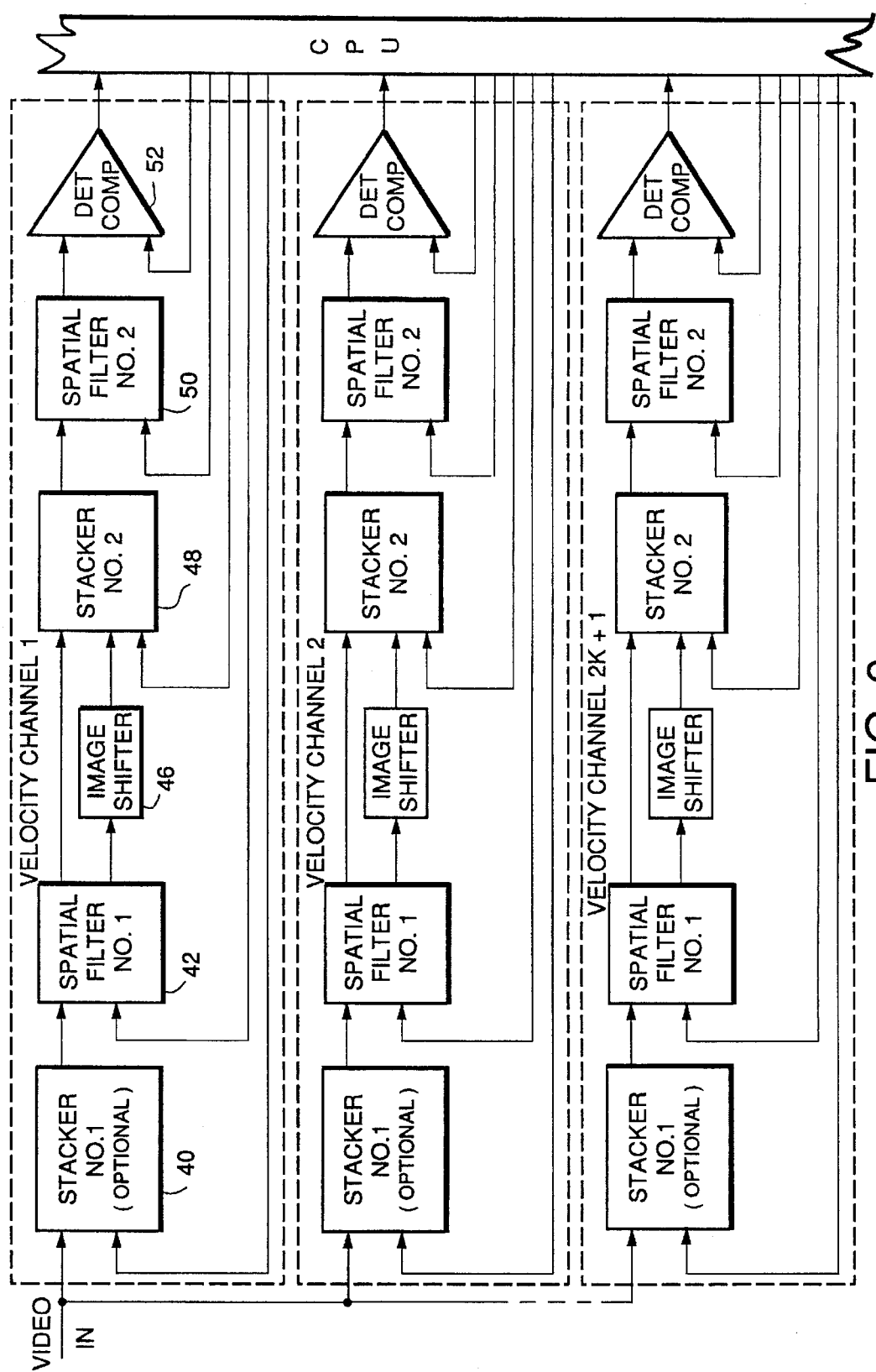
FIG. 9 is a block diagram of the application of the present invention in a parallel processing system.

This problem is overcome by the approach illustrated in FIG. 9. The procedure illustrated in FIG. 3 and discussed earlier is termed a velocity channel of velocity hypothesis v1. Other velocity channels at other velocity hypotheses v2, v3, etc. are also processed, preferably by parallel processing. The values of the velocity hypothesis chosen are preferably distributed about the expected true velocity of v, provided approximately by the acquisition aid. The actual velocity of the target is that velocity hypothesis that yields the smallest size, most intense target in the stacked and filtered image produced by the velocity channels.

The techniques used in the channels are identical, as are the various sensor images at times t and the corresponding first spatially filtered images. There is therefore a good deal of common information that can be used by the different channels. The channels differ at the point where the images are shifted, as the shifting factors are −v1t, −v2t, −v3t, etc., where t also changes in each case for the respective acquisition times of the images.

The present invention has been tested in simulated moving target situations and has been found to automatically select the target. In practice, the identified target information is supplied to other systems or to a system operator.

Although a particular embodiment of the invention has been described in detail for purposes of illustration, various modifications may be made without departing from the spirit and scope of the invention. Accordingly, the invention is not to be limited except as by the appended claims.

What is claimed is:

1. A method for detecting moving objects, comprising the steps of:
   furnishing an imaging sensor;
   forming a plurality of filtered, shifted images of a scene containing a moving object beginning at an initial time t=0, by
      providing a sensed image of the scene at a time t using the sensor,
      spatially filtering the sensed image to remove objects of a size larger than a first preselected size, to produce a filtered image,
      shifting the position of the filtered image by an amount −vt, where v is a velocity hypothesis, to produce a filtered, shifted image, and
      repeating the steps of providing and spatially filtering to produce a plurality of filtered, shifted images;
   adding the plurality of filtered, shifted images together to produce a stacked image;
   spatially filtering the stacked image to remove objects of a size larger than a second preselected size, to produce a filtered, stacked image; and
   selecting those features, if any, of the filtered, stacked image having an intensity greater than a preselected intensity as the moving objects.

2. The method of claim 1, including the additional step, after the step of providing a sensed image and before the step of spatially filtering the sensed image, of
   summing together a second plurality of the sensed images provided at time t, and using this summed image as the sensed image for subsequent processing.

3. The method of claim 1, wherein the step of spatially filtering the image is accomplished by a minimum difference processor filter.

4. The method of claim 3, wherein the minimum difference processor filter utilizes four linear antimedian subfilters.

5. The method of claim 1, wherein the step of spatially filtering the stacked image is accomplished by a minimum difference processor filter.

6. The method of claim 5, wherein the minimum difference processor filter utilizes four linear antimedian subfilters.

7. The method of claim 1, wherein the sensor is scanned across the scene as the images are provided at the times t1, t2, . . . tn.

8. The method of claim 1, including the additional parallel step of
   performing the steps of
      forming a plurality of filtered, shifted images, except using a different value of velocity hypothesis,
      adding the plurality of filtered, shifted images together,
      spatially filtering the stacked image, and
      selecting those features, if any, of the filtered, stacked image having an intensity greater than a preselected intensity as the moving objects.

9. A method for detecting moving objects, comprising the steps of:

(a) furnishing an imaging sensor;

(b) providing a plurality of processors, each processor acting to form a plurality of filtered, shifted images of a scene containing objects, beginning at an initial time t=0, by providing a plurality of sensed images of the scene at times t1, t2, . . . tn using the sensor, spatially filtering each of the sensed images to remove objects of a size larger than a first preselected size, to produce a plurality of filtered images, and shifting the position of each of the filtered images by an amount −vt, where v is a velocity hypothesis that differs for each of the plurality of processors, to produce a plurality of filtered, shifted images;

adding the plurality of filtered, shifted images for each respective processor together on a pixel-by-pixel basis to produce a stacked image for each respective processor;

spatially filtering the stacked images of each processor to remove objects of a size larger than a second preselected size, to produce a filtered, stacked image for each respective processor; and selecting those features, if any, of the filtered, stacked images of the respective processors having an intensity greater than a preselected intensity as the moving objects; and (c) choosing among the plurality of processors that which yields the most intense object at the velocity hypothesis utilized by the respective processor, that most intense object being selected as the target and that velocity hypothesis being selected as the true velocity of the target.

10. The method of claim 9, including the additional step, after the step of providing the plurality of sensed images and before the step of spatially filtering each of the sensed images, of summing together a second plurality of the sensed images provided at time t, and using this summed image as the sensed image for subsequent processing.

11. The method of claim 9, wherein the step of spatially filtering the image is accomplished by a minimum difference processor filter.

12. The method of claim 11, wherein the minimum difference processor filter utilizes four linear antimedian subfilters.

13. The method of claim 9, wherein the step of spatially filtering the stacked image is accomplished by a minimum difference processor filter.

14. The method of claim 13, wherein the minimum difference processor filter utilizes four linear antimedian subfilters.

15. The method of claim 9, wherein the sensor is scanned across the scene as the images are provided at the times t.

16. Apparatus for detecting moving objects in a cluttered field, comprising:

a sensor that produces a digitized image of a scene;

a first spatial filter that removes objects of a size larger than a first preselected size from the digitized image to produce a spatially filtered image;

an image shifter that shifts the spatially filtered image by an amount −vt to produced a filtered, shifted image, where v is a velocity hypothesis and t is a time at which the digitized image was sensed;

a stacker that stacks a plurality of the filtered, shifted images sensed at different values of t, to produce a stacked image; and a second spatial filter that removes objects of a size larger than a second preselected size from the stacked image.

17. The apparatus of claim 16, wherein at least one of the spatial filters is a minimum difference processor filter.

* * * * *